(12) United States Patent  
Pattikonda

(10) Patent No.: US 8,515,505 B1  
(45) Date of Patent: Aug. 20, 2013

(54) SYSTEM AND METHOD OF UTILIZING A WATCH AS A COMPANION DEVICE FOR A MOBILE PHONE

(76) Inventor: Ram Pattikonda, Houston, TX (US)

( * ) Notice: Subject to any disclaimer, the term of this patent is extended or adjusted under 35 U.S.C. 154(b) by 0 days.

(21) Appl. No.: 13/353,528

(22) Filed: Jan. 19, 2012

Related U.S. Application Data

(60) Provisional application No. 61/434,408, filed on Jan. 19, 2011.

(51) Int. Cl.
*H04M 1/00* (2006.01)
(52) U.S. Cl.
USPC .................... 455/575.6; 455/90.3; 455/556.2; 368/281
(58) Field of Classification Search
USPC ............ 455/90.3, 550.1, 556.1, 556.2, 575.1, 455/575.6; 368/281
See application file for complete search history.

(56) References Cited

U.S. PATENT DOCUMENTS

| | | | | |
|---|---|---|---|---|
| 6,078,803 | A * | 6/2000 | Fernandez Martinez | 455/349 |
| 7,187,908 | B2 * | 3/2007 | Fujisawa et al. | 455/88 |
| 7,251,197 | B2 * | 7/2007 | Yoshida et al. | 368/10 |
| 8,244,181 | B2 * | 8/2012 | Shuo | 455/41.2 |
| 2010/0112964 | A1 * | 5/2010 | Yi et al. | 455/90.3 |

* cited by examiner

*Primary Examiner* — Nhan Le
(74) *Attorney, Agent, or Firm* — Michael Diaz

(57) ABSTRACT

An apparatus worn by a user providing an interface with a mobile device. The apparatus includes a main body having a display, at least one strap for attaching the apparatus to the user, and a microcontroller for wirelessly communicating with a mobile device of the user. The microcontroller provides an interface for using the mobile device from the apparatus. The apparatus may be a wrist watch worn by the user. In one embodiment, the apparatus may include a wand for providing phone operations. In another embodiment, the wand may include a sound projection speaker allowing sound to be redirected and amplified by a users palm. In another embodiment, the apparatus may include a wireless dongle for providing phone functions to the user.

14 Claims, 7 Drawing Sheets

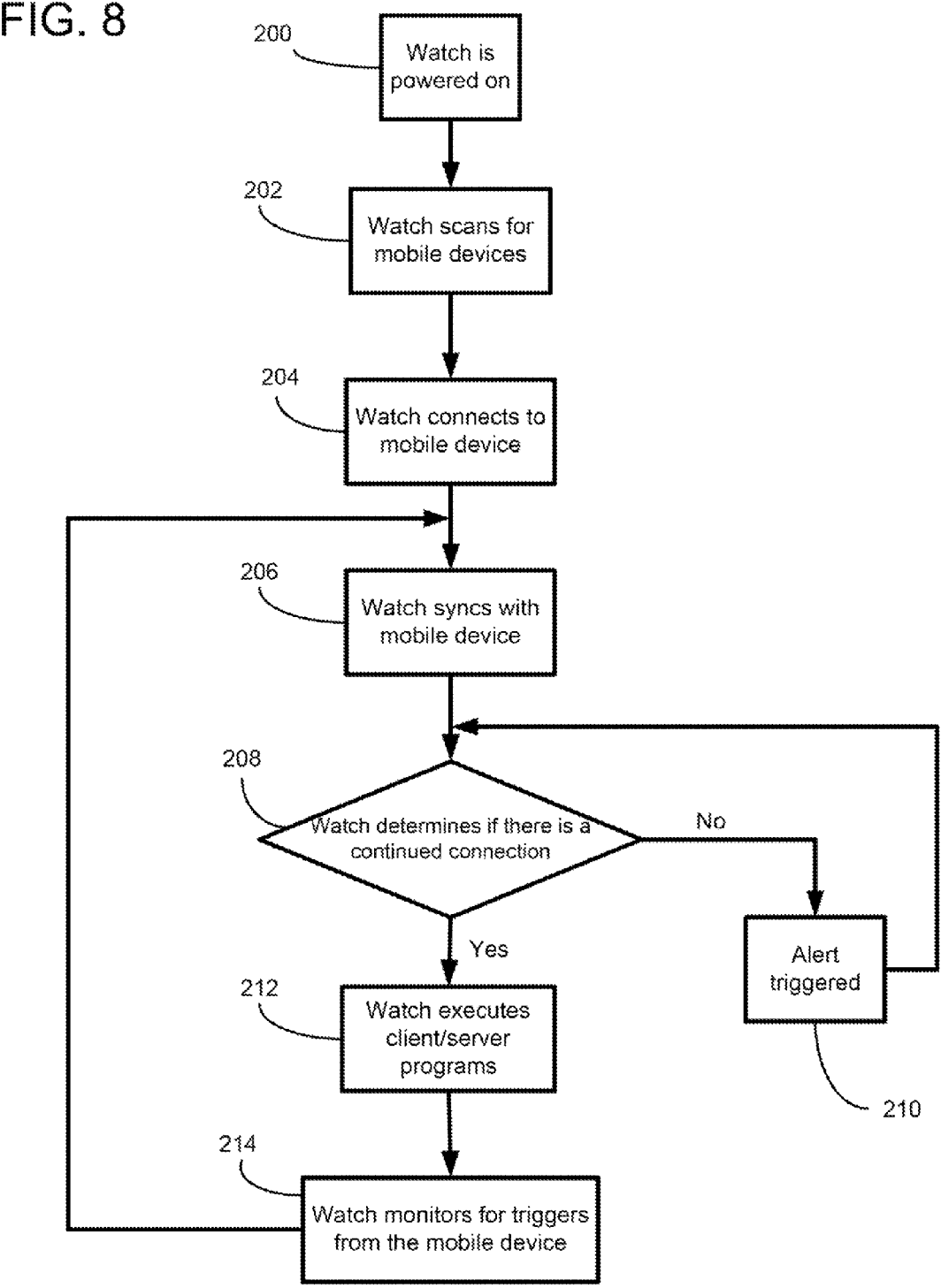

SYSTEM AND METHOD OF UTILIZING A WATCH AS A COMPANION DEVICE FOR A MOBILE PHONE

RELATED APPLICATIONS

This utility application claims the benefit of U.S. Provisional Patent Application Ser. No. 61/434,408 by Ram Pattikonda, filed Jan. 19, 2011 is hereby incorporated by reference.

BACKGROUND OF THE INVENTION

1. Field of the Invention

This invention relates to communication systems. Specifically, and not by way of limitation, the present invention relates to a system and method of utilizing a watch as a companion device for a mobile phone.

2. Description of the Related Art

The use of mobile phones in our society has become pervasive with their capabilities continuously increasing. With increased capability, the size of the devices is getting relatively bigger while the fragility of these devices is also increasing. With these increased capabilities, the mobile phones are becoming more like a handheld computer, resulting in awkward use of the device as a phone. Although these devices are used mostly for making and receiving phone calls, they are designed to be more like display devices or handheld computers.

It would be advantageous to have a companion device such as an apparatus built into wrist watch providing an interface to the larger mobile phones or other mobile devices for use in frequently used operations. It is an object of the present invention to provide such a system and method.

SUMMARY OF THE INVENTION

In one aspect, the present invention is directed to an apparatus worn by a user. The apparatus includes a main body having a display, at least one strap for attaching the apparatus to the user, and a microcontroller for wirelessly communicating with a mobile device of the user. The microcontroller provides an interface for using the mobile device from the apparatus. The apparatus may be a wrist watch worn by the user. In one embodiment, the apparatus may include a wand for providing phone operations. In another embodiment, the wand may include a sound projection speaker allowing sound to be redirected and amplified by a user's palm. In another embodiment, the apparatus may include a wireless dongle for providing phone functions to the user.

In another aspect, the present invention is a system providing an interface for performing functions. The system includes a mobile device capable of performing functions and an apparatus worn by a user. The apparatus includes a main body having a display, at least one strap for attaching the apparatus to the user, and a microcontroller for wirelessly communicating with a mobile device of the user. The microcontroller provides an interface for using the mobile device from the apparatus.

In still another aspect, the present invention is a method of providing an interface with a mobile device. The method begins by a user wearing an apparatus for interfacing with the mobile device. A connection is then established between the apparatus and the mobile device. An interface is provided on the apparatus for performing functions of the mobile device from the apparatus. The user may then perform functions upon the apparatus to operate the mobile device.

BRIEF DESCRIPTION OF THE DRAWINGS

FIG. 8 is a flow chart illustrating the steps of using the watch according to the teachings of the present invention.

DESCRIPTION OF THE INVENTION

Figure 1:
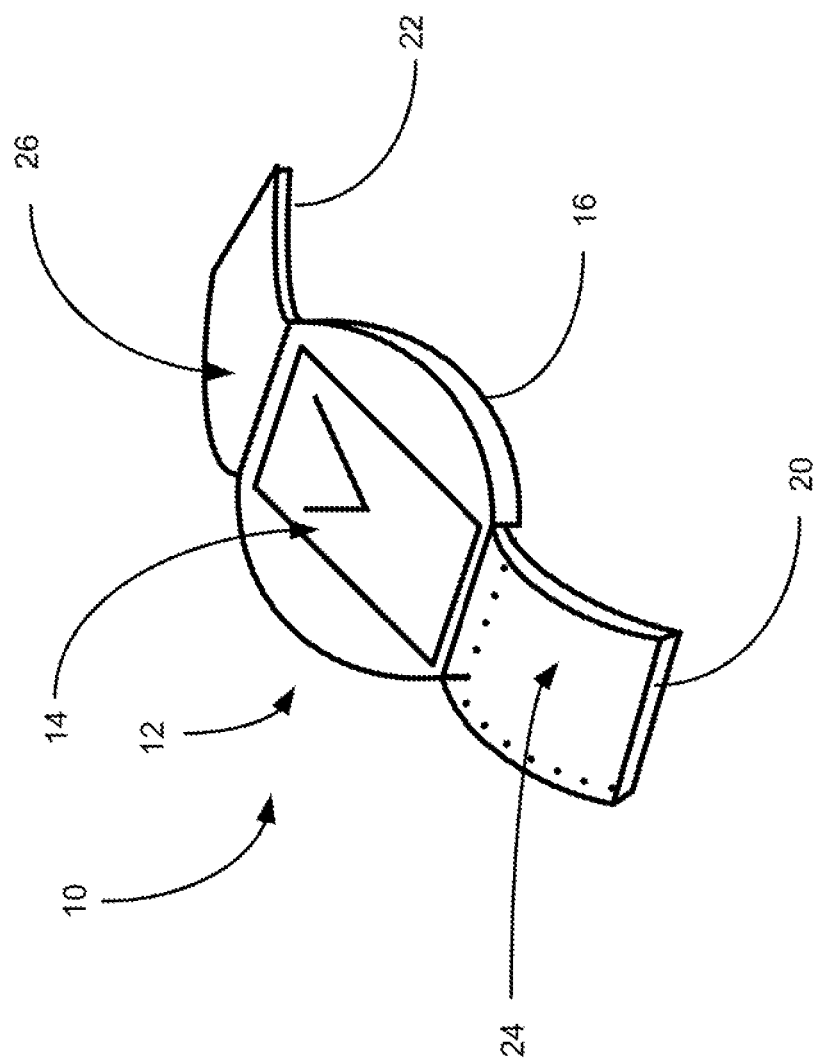
FIG. 1 is a front perspective view of a companion wrist watch in one embodiment of the present invention.

The present invention is a system and method of utilizing a watch as a companion device for a mobile phone. FIG. 1 is a front perspective view of a companion wrist watch 10 in one embodiment of the present invention. The wrist watch 10 includes a main body 12 having a display 14 and electronics 16. The electronics may include a processor, such as a microcontroller, wireless device, and other electronics necessary for operating the wrist watch 10. On one end of the main body 12 is a first strap 20 with a second strap 22 located on an opposing end of the main body. Each strap may include solar cells 24 and 26.

Figure 2:
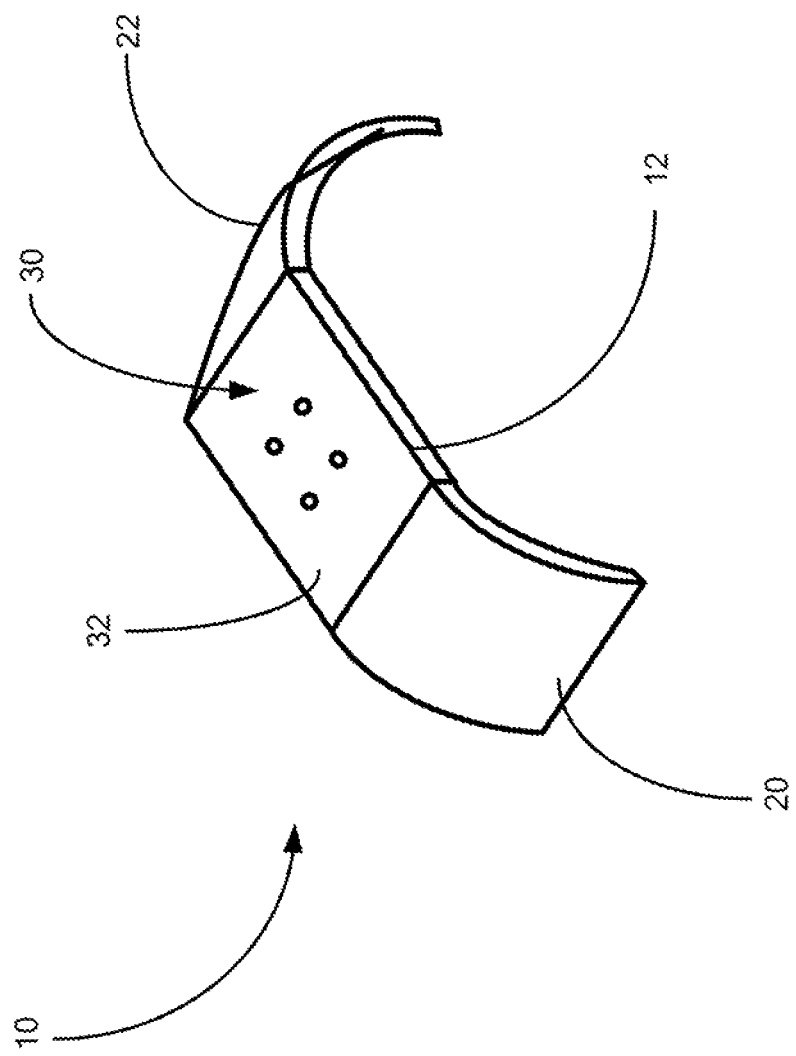
FIG. 2 is a perspective view of a bottom side of the wrist watch of FIG. 1.

FIG. 2 is a perspective view of a bottom side of the wrist watch 10 of FIG. 1. The main body 12 may include a bottom side 30 having an attachment module 32 for a speaker wand or wireless dongle.

In a normal mode, the wrist watch displays time and date on the display surface 14. The time and date may be synchronized with a mobile phone (not shown in FIG. 1). In addition, the time and date may be displayed in different formats and time zones as desired by the user.

The wrist watch, in conjunction with the mobile phone, may be utilized for a voice phone call. During an incoming call, the mobile phone sends a message containing information about the caller to the watch. This information is displayed on the phone and the display 14. The user can either accept or reject the call. Once accepted, voice communication is established with the mobile phone. With the mobile phone kept in silent mode, the call information can be shown on the watch with vibration and minimal disturbance to the user. The user may also use the call history or favorite phone numbers list displayed on the phone to make outgoing calls. The user may also search for contacts, although cumbersome in a small screen (i.e., display 14), to select a number and dial out. The user may also display number pad and dial out numbers on the display 14. In addition to touch screen input, a camera based input device/mouse could also be used to ease the use of selection on the display.

Figure 4:
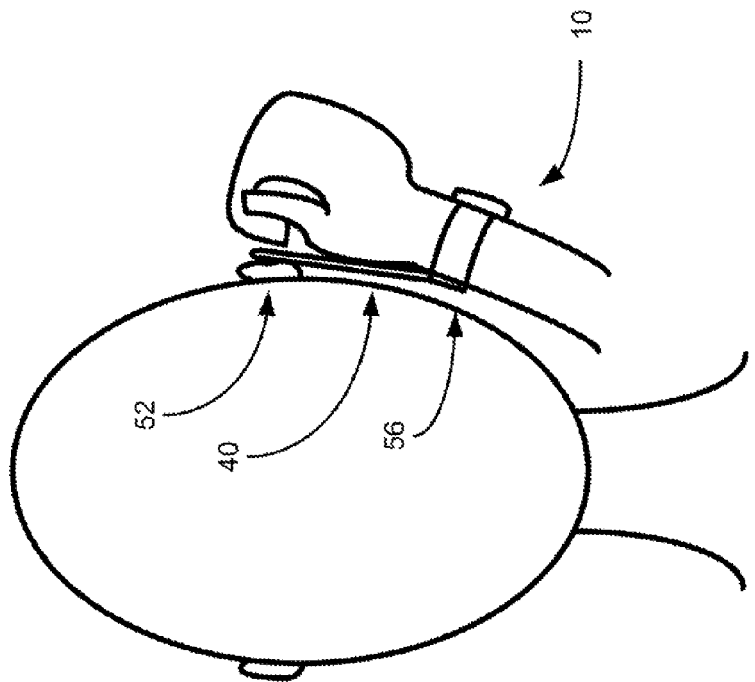
FIG. 4 is a front view of the wand utilized by the user.
Figure 3:
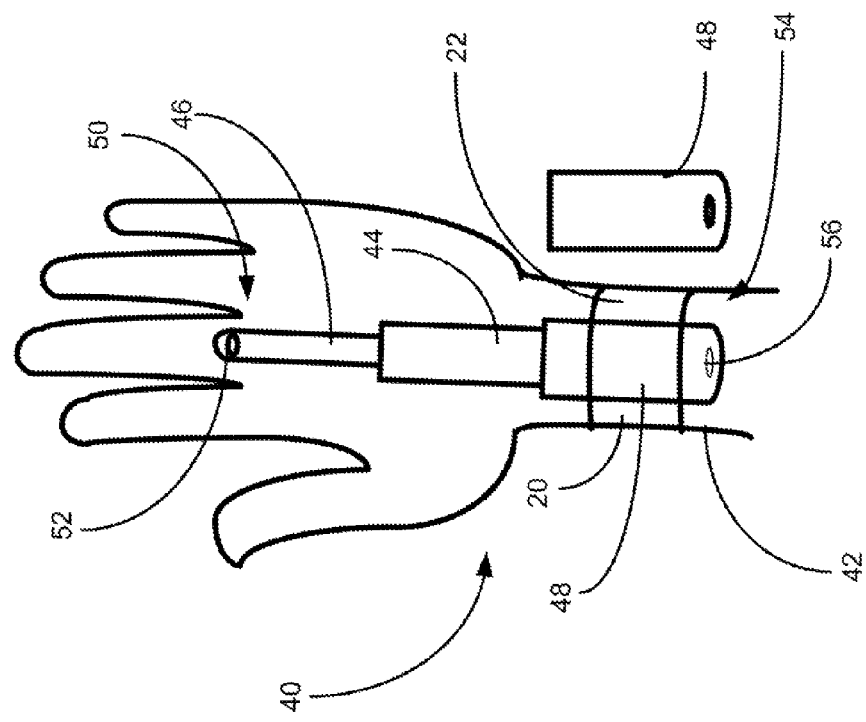
FIG. 3 is a front view of a telescopic wand attached to a wrist of a user in one embodiment of the present invention.

In the present invention, voice communications may be established in various ways, such as via a telescopic wand, projected sound through a user's palm, or a wireless dongle. FIG. 3 is a front view of a telescopic wand 40 attached to a wrist 42 of a user. The telescopic wand 40 includes segments 44 and 46 which may be telescopically extended from a wand module 48. In one embodiment, the wand 40 is attached to the bottom side of the watch 10 (such as between the straps 20 and 22 and the users wrist 42). At an upper end 50 of the wand is a speaker 52. On an opposite lower end 54 is a microphone 56. FIG. 4 is a front view of the wand 40 utilized by the user. As illustrated in FIGS. 3 and 4, the wand 40 is attached to the bottom of the watch straps. The user may extend the telescopic wand and hold the speaker near the palm to hear. The microphone may be positioned near the mouth when talking on the mobile phone. The telescopic wand communicates, in conjunction with the wrist watch 10, to the mobile phone using the wireless mechanism in the electronics 16.

Figure 5:
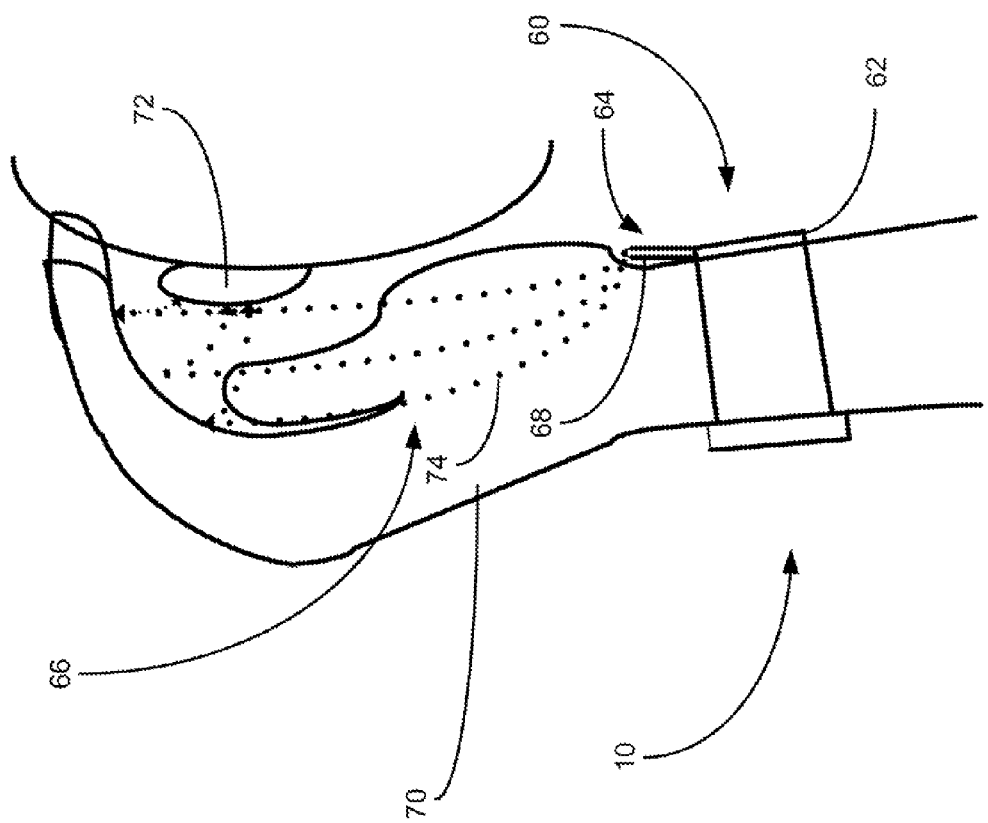
FIG. 5 is a side view of a wand attached to the wrist watch in another embodiment of the present invention.

In a second embodiment, a users palm is used for projected sound to the users ear. FIG. 5 is a side view of a wand 60 attached to the wrist watch 10. The wand 60 includes a microphone 62 on a bottom end of the wand in a similar fashion as the telescopic wand 40 of FIG. 3. The wand 60 preferably is not extendable wherein an upper end 64 of the wand is positioned slightly below a bottom edge of the users palm 66. The upper end includes a sound directing speaker 68. The user holds the user's hand 70 to the user's ear 72 as shown in FIG. 5. The sound 74 projected to the palm 66 by the speaker 68 is directed and concentrated to the ear. The palm folded around the ear acts as a redirecting and amplification device. In a similar manner as the wand 40, the wand 60 communicates, in conjunction with the wrist watch 10, with the mobile phone to act as a voice channel of the phone. In this embodiment, the speaker utilizes a palm of the user for redirecting and amplifying the projected sound. In this embodiment, the present invention may be any device worn by the user to redirect and amplify the projected sound originating from any device capable of generating sound (e.g. MP3 player, mobile phone, etc.).

Figure 6:
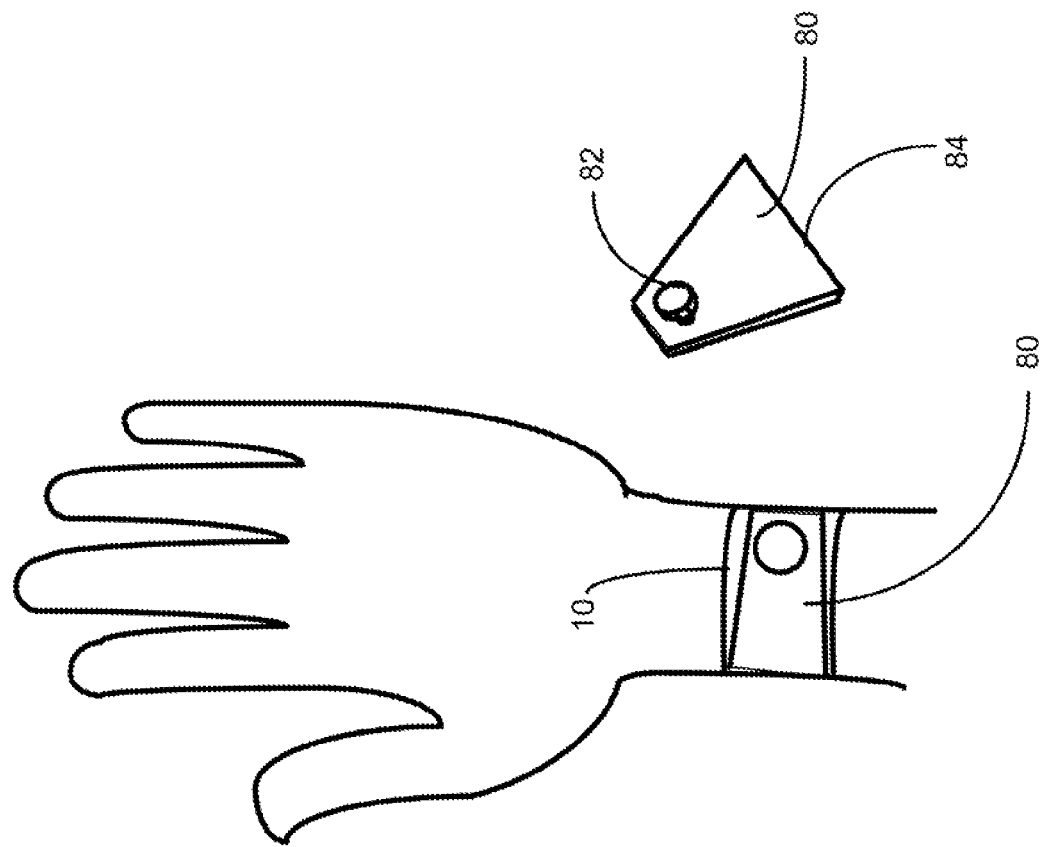
FIG. 6 is a front view of a detachable wireless dongle in another embodiment of the present invention.

In a third embodiment, a wireless dongle may be utilized. FIG. 6 is a front view of a detachable wireless dongle 80 in another embodiment of the present invention. The dongle may be detachably attached to the wrist watch 10. When desired, the user detaches the dongle and places the dongle in the user's ear while having a voice conversation. This dongle may be similar to a Bluetooth ear bud device having an ear bud 82 and a microphone 84. However, this dongle may include charging from the watch and communicate through a voice channel established via the wrist watch 10.

In another embodiment, the watch 10 may establish a connection with home wireless phones, such as a 2.4 Giga Hz base phone. In addition, the user may use his palm as a voice communication device without searching for the wireless handset.

The watch may also be used to track a mobile phone. Once the watch 10 establishes a wireless connection to the mobile phone, the watch may continual check that the connection is retained. For a Bluetooth wireless connection, the range is approximately 20 feet. When the connection is lost, the watch may be configured to sound or display an alarm to indicate to the user that the connection has been lost. The user may then take action to recover the lost mobile phone. This monitoring could be done with millisecond frequency so that the mobile phone is never lost.

Additionally, the watch 10 may be utilized as a power source. It is quite common for companion devices, such as Bluetooth headsets, to require a charge often. If this additional charging task is not carried out, the companion device is not usable. The watch 10 may utilized the solar cells 24 and 26 or kinetic movement to charge the battery in a power module. The use of low power display and ultra low power microcontrollers combined with light and motion charging will enable perpetual usage of the device without charging. The watch may also be utilized to charge the wireless dongle 80 discussed in FIG. 6.

The wrist watch 10 may include a power management system (see FIG. 7) so that the basic low power consumption modules, such as microcontroller processing, Real Time Clock and low power display are powered for long durations using the solar charge from the solar cells. The high power consumption modules, such as Bluetooth wireless, are powered for shorter periods when an additional charge is required. Additional external charging would extend the period of high power consumption modules.

The watch 10 may also provide for alerts and a summary message display. The user may see summary email or SMS messages on the watch display 14. Scheduled alarms such as meetings may also be displayed on the watch display.

In addition, the watch 10 may be utilized as a wallet replacement. A magnetic or a Radio-frequency Identification (RFID) wireless security authentication may be implemented as a dongle in the watch. This dongle may have real-time authentication of security through the mobile phone. The dongle may also have the electronic currency or electronic credit card validation built into it. The dynamic RFID with real-time link may act as a credit card, electronic currency or security authentication. With a security dongle and ability to display ID, most of the functions of the wallet may be implemented in the watch 10

The watch may also be used in a client server architecture. The watch 10 may be used as a client to the attached mobile phone with the mobile phone acting as a server. A server application may run on the mobile phone and a client application may run on the watch. Using this embodiment, power intensive high performance applications may be implemented without adding volume or processing power in the client. The watch may act like a display device for high performance applications running in the mobile phone. The client program in the watch may collect data which is fed into the master server device (e.g., mobile phone). The master application in the mobile phone would process the data and give results to the watch.

In one embodiment, the watch may be utilized in sports and fitness activities. While playing sports or rigorous fitness, it is often hard to carry a mobile device, which can be bulky and prone to breakage. In this embodiment, the user may leave the mobile device in the vicinity of the user, although not held by the user, and still be connected to many of the functions of the mobile phone, such as make-receive calls and check messages. The watch may have sensors to collect data such as pulse rate and pedometer. The watch may use the client server architecture to store the sensor collected fitness data as hours worked, pulse rate of the user and distance walked type functions in the attached mobile device.

Figure 7:
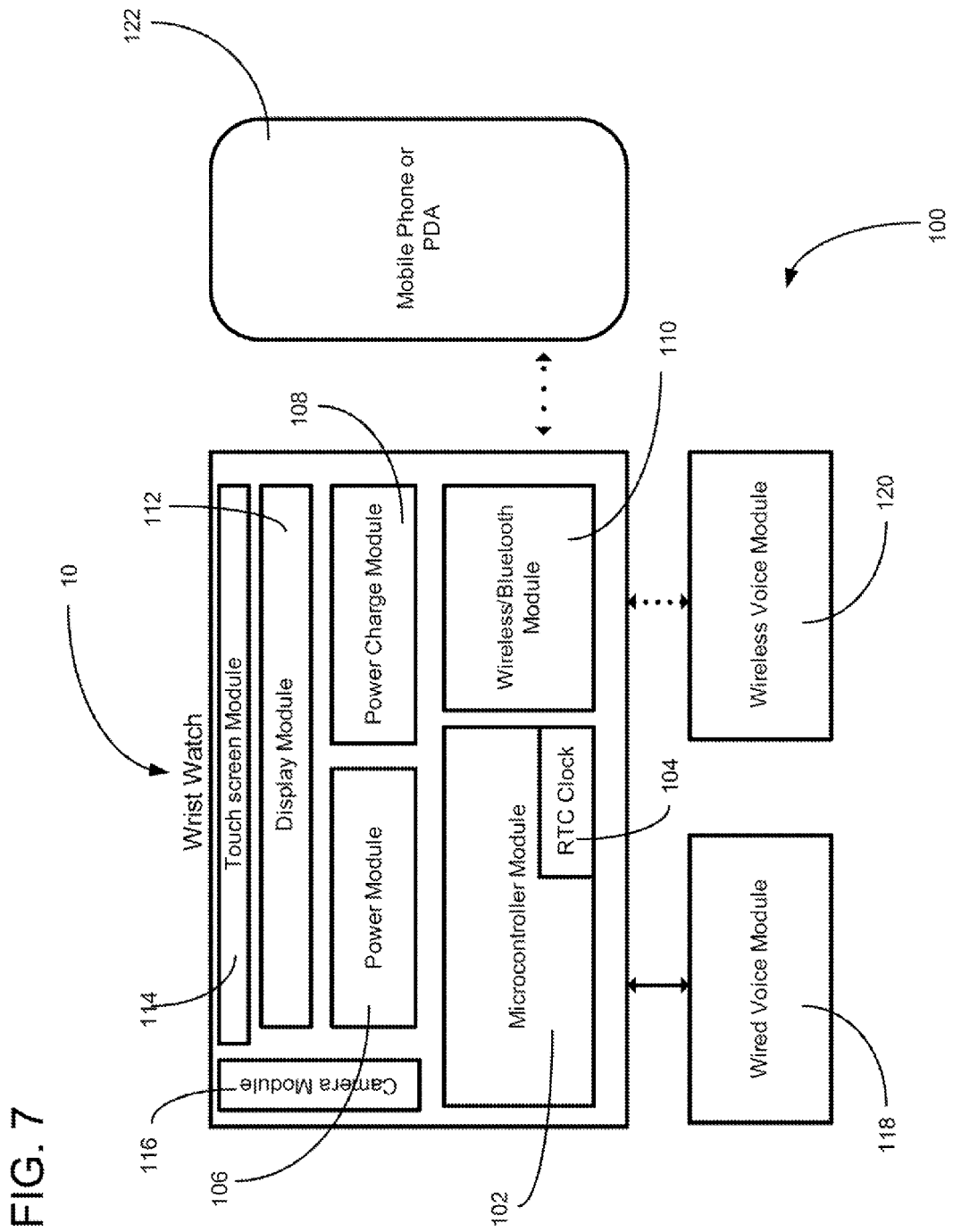
FIG. 7 is a simplified block diagram of a system utilizing the wrist watch.

FIG. 7 is a simplified block diagram of the components of a system 100 in one embodiment of the present invention. The system 100 includes a microcontroller module 102 (processor) having an Real Time Clock (RTC) Clock 104, a power module 106, a power charge module 108, a wireless/Bluetooth module 110, a display module 112, a touch screen module 114, a camera module 116, a wired voice module 118 and a wireless voice module 120.

At the most basic level, the system 100 includes the display 14 for time and other information output, a touch screen or camera for data input, a microphone and speaker for voice input and output, the wireless/Bluetooth module 110 for communicating with a mobile phone 122, companion mobile device, battery with power management, solar or kinetic power module and microcontroller module for driving and coordinating all the functions.

FIG. 7 illustrates many of the sub-systems which may be utilized with the watch 10. It should be understood that the list of components is not limited to the components illustrated in FIG. 7. Furthermore, not all of the components are necessary for the system 10 to function and remain in the scope of the present invention. The microcontroller module 102 drives and integrates all the sub-system modules. It maintains its own time using the RTC dock 104, which is synchronized with the paired mobile phone 122 periodically. The RTC may have its own long term battery to power it for long periods to maintain the internal time without the link to the companion mobile phone. The clock time and date data is used as a primary display for the display module 112. Although a mobile phone is depicted, any mobile communication device may be utilized with the watch 10, such as a tablet, Personal Data Assistant (PDA), etc.

The wireless/Bluetooth module 110 may be used to establish a connection with the mobile phone, exchange data with the mobile phone and establish voice channel communication with the mobile phone. The voice mobile phone, either wired or wireless, is used for user conversations through the voice channel. The voice modules 118 and 120 (both wired and wireless) may include an independent voice channel with the mobile phone, speaker and microphone. The speaker and microphone may be either part of the watch with the telescopic dongle or independent wireless dongle.

The display module 112 may be a general purpose graphical display to display time information, call indications, message information or any other data to be presented to the user. The display module may use an Liquid Crystal Diode (LCD), Organic Light-Emitting Diode (OLED) or any other graphical display technologies with power saving built into the design. The display module may be integrated with the touch screen module 114 for user input.

The power module 106 may be designed to work off a chargeable battery with prudent power management. The power charge module may use solar power or mechanical kinetic movement of the wrist and continuously charge the battery when power is available. In the preferred embodiment of the present invention, the complete system 100 may be built using the maximum power saving components such as ultra low power micro controller, power saving OLEO type displays and low power speakers to help the power management.

FIG. 8 is a flow chart illustrating the steps of using the watch 10 according to the teachings of the present invention. In step 200, the watch is powered up. Upon power up, the microcontroller module 102 scans for nearby mobile devices at step 202. Next, the watch 10 connects, through the wireless/Bluetooth module 110, to the registered mobile device (e.g., mobile phone 122) in step 204, Next, in step 206, the watch, through the microcontroller module, synchronizes time with the mobile device and stores the time in its RTC 104. It gets a list of pending as well as forthcoming alarms/tasks. The watch 10 displays the synchronized time and any pending alarms/tasks. If no connection to the mobile device, the watch works as a standalone watch and periodically scans for the availability of the relevant mobile device.

In step 208, when connected to the mobile device, the watch 10 scans for the connection periodically and determines if there is a connection. If the connection is lost, the method moves to step 210 where an alarm is trigger to the user on the loss of the attached device in real-time. If the disconnection is intentional, the user can disable this alarm. If the loss is real, the watch will help the user recover the mobile device. Next, the method returns to step 208 after reestablishing the connection.

If it is determined in step 208 that the watch is still connected to the mobile device, the method moves to step 212 where the watch 10 executes any client/server programs. Next, in step 214, the watch determines if a trigger is received from the mobile device. For an incoming call, the watch is notified of the incoming call and establishes a voice channel upon acceptance of the call by the user. The user may then engage in a conversation using one of the wired or wireless speaker-microphone. When the user ends the call, it is indicated to the mobile device to end the voice channel. The watch may receive an SMS or email message received at the mobile device, the mobile device may then provide an indication to the watch 10 with a message summary. The user may then check the details using the mobile device or send short replies to messages using the watch as an input device. Next, the method then returns to step 206.

Although the present invention has been described as a wrist watch, the present invention may be embodied in any mobile device capable of being carried or worn. The present invention is a wrist watch or other mobile carriage device that communicates with a paired mobile device, such as mobile phone or PDA and provides interface to use of many of the functions of the mobile device without the need to open the bulkier counterpart for frequently used operations. These supported functions include receiving and making phone calls, checking incoming calls, checking summary messages, checking synchronized time, etc. The wrist watch may also monitor the presence of the larger mobile device and trigger an alarm during the loss of the mobile phone.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed is:

1. An apparatus worn by a user, the apparatus comprising:
a main body having a display;
at least one strap for attaching the apparatus to the user;
a processor for managing functions including wirelessly communicating with a separate companion mobile device of the user and providing an interface for using the mobile device from the apparatus;
wherein the mobile device is a mobile phone and the apparatus includes a mechanism to establish a voice channel with the mobile phone for performing phone operations through the mobile phone;
wherein the apparatus includes a wand having a microphone and a speaker;
wherein the apparatus includes a mechanism for projecting directional sound through the speaker using a palm of the user for redirecting and amplifying the projected sound;

wherein the user interfaces with the apparatus to perform operations upon the mobile device.

2. The apparatus according to claim 1 further comprising a detachable wireless dongle attachable to the apparatus, the wireless dongle providing a voice channel through the apparatus to the mobile phone.

3. The apparatus according to claim 1 wherein the apparatus is a wrist watch having straps attachable to a wrist of the user.

4. The apparatus according to claim 1 wherein the apparatus includes a mechanism for tracking the mobile device.

5. The apparatus according to claim 1 wherein the apparatus operates as a client to the mobile device in a client/server architecture.

6. The apparatus according to claim 1 wherein the apparatus includes a solar cell for obtaining solar energy.

7. The apparatus according to claim 1 wherein the apparatus includes a mechanism to kinetically charge the apparatus.

8. The apparatus according to claim 1 wherein the display displays messages or alerts from the mobile phone.

9. The apparatus according to claim 1 wherein the apparatus is a wireless handset for a wireless home-based phone.

10. The apparatus according to claim 1 wherein the apparatus includes a mechanism utilizing identification technology for securely identifying the apparatus to another device.

11. The apparatus according to claim 1 wherein the apparatus includes a mechanism for obtaining biological and other data of the user through sensors and transmitted to the mobile device.

12. A system providing an interface for performing functions, the system comprising:
    a mobile device capable of performing functions;
    an apparatus worn by a user, the apparatus comprising:
        a main body having a display;
        at least one strap for attaching the apparatus to the user;
        a processor for managing functions including wirelessly communicating with a separate companion mobile device of the user and providing an interface for using the mobile device from the apparatus;
    wherein the mobile device is a mobile phone and the apparatus includes a mechanism to establish a voice channel with the mobile phone for performing phone operations through the mobile phone;
    wherein the apparatus includes a wand having a microphone and a speaker;
    wherein the apparatus includes a mechanism for projecting directional sound through the speaker using a palm of the user for redirecting and amplifying the projected sound;
    wherein the user interfaces with the apparatus to perform operations upon the mobile device.

13. The system according to claim 1 wherein the apparatus is a wrist watch worn by the user.

14. A method of providing an interface with a mobile device, the method comprising the steps of:
    wearing an apparatus for interfacing with the mobile device, wherein the mobile device is a separate companion mobile device;
    establishing a connection between the apparatus and the mobile device, wherein the step of establishing a connection includes establishing a voice channel with the mobile device for performing phone operations through the mobile device;
    wherein the apparatus includes a wand having a microphone and a speaker;
    wherein the apparatus includes a mechanism for projecting directional sound through the speaker using a palm of the user for redirecting and amplifying the projected sound,
    providing an interface on the apparatus or performing functions of the mobile device from the apparatus; and
    performing functions upon the apparatus to operate the mobile device.

\* \* \* \* \*